No. 646,128. Patented Mar. 27, 1900.
M. L. PRICE.
DISH DRAINER.
(Application filed Apr. 9, 1898.)
(No Model.)
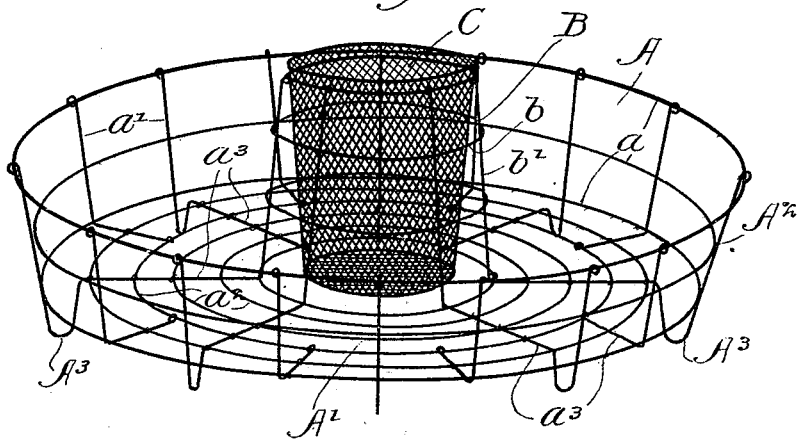
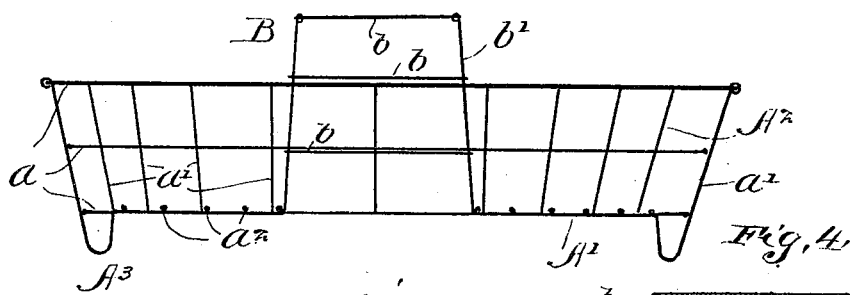
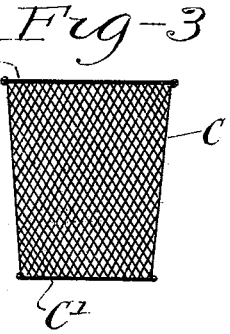
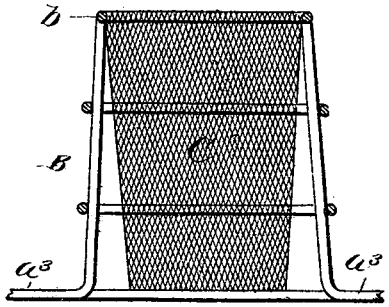
Witnesses
Harold G Barrett.
W A Whitehead
Inventor
Marie L. Price
by Poole & Brown Attys

United States Patent Office.

MARIE L. PRICE, OF CHICAGO, ILLINOIS, ASSIGNOR OF ONE-THIRD TO BERTHA A. PRICE, OF SAME PLACE.

DISH-DRAINER.

SPECIFICATION forming part of Letters Patent No. 646,128, dated March 27, 1900.

Application filed April 9, 1898. Serial No. 677,001. (No model.)

*To all whom it may concern:*

Be it known that I, MARIE L. PRICE, of Chicago, in the county of Cook and State of Illinois, have invented certain new and useful Improvements in Dish-Drainers; and I do hereby declare that the following is a full, clear, and exact description thereof, reference being had to the accompanying drawings, and to the letters of reference marked thereon, which form a part of this specification.

This invention relates to improvements in dish-drainers of that class in which the receptacle for receiving the dishes is supported above and out of contact with the receptacle or surface which receives the drip-water and is made of such construction as to provide openings in the bottom thereof for the escape of drip-water and also to provide for the free circulation of air between the dishes.

The object of the invention is to provide an economical and efficient device of the character set forth; and the invention consists in the matters hereinafter described, and more particularly pointed out in the appended claims.

In the drawings, Figure 1 is a perspective view of a device constructed in accordance with my invention. Fig. 2 is a cross-section thereof with parts removed. Fig. 3 is a view of the receptacle or basket for receiving the smaller articles, such as knives, forks, &c. Fig. 4 is a detail showing the basket attached to the upper wire or rail of the stand in a modified form.

As shown in said drawings, A designates an open-topped shallow receptacle made of open wirework and consisting of a horizontal bottom A' and an annular upwardly-extending marginal rim $A^2$. The receptacle is herein shown as made of circular form; but it may be made of any desired conformation. The rim $A^2$ consists of a plurality of horizontally-arranged wire rings $a$, located one above the other, which are joined in rigid relation by stays $a'$ in a manner common in wire articles. Said rings are made of gradually-increasing diameter from the bottom to the top of the receptacle to give an outwardly-flaring shape to the rim. The bottom of the receptacle consists of a plurality of concentric rings $a^2$, arranged inside of the rim and joined by horizontally-arranged radially-extending stays $a^3$, which are preferably formed in one piece with the stays $a'$. Conveniently certain of the pieces of wire forming the stays $a'$ $a^3$ are bent in loop form between said rim and bottom portion of the drainer to form supporting-legs $A^3$.

B designates an upright supporting-standard located centrally of the bottom of the receptacle and extending upwardly a distance, preferably above the top of the rim $A^2$. Said standard is designed to afford a support against which the dishes and other articles to be drained may be allowed to rest when in a leaning position, such support for this purpose being made of upwardly-tapering form in order that the articles to be drained may assume an inclined position when leaning against the same and at the same time be capable of engaging the bottom of the receptacle closely adjacent the base of the support. Said support is preferably made of open wirework, like the receptacle proper, and consists, in the instance shown, of a plurality of horizontally-arranged rings $b$, located one above the other and joined in rigid relation by means of inclined stays $b'$. Said inclined stays are desirably made integral with the horizontal stays $a^3$ of the bottom of the receptacle, a single wire in such case forming the means for attaching the parts of the standard, the several rings forming the bottom, and the rings forming the rim of the device. This construction is of great practical importance, as it gives great strength and rigidity to the device as a whole and prevents the parts from being disjoined by rough usage. The several parts of the device are joined together in a manner well known to those familiar with the art of wire-weaving, and said members are made of wire of such gage as to give the proper strength and rigidity to the device.

The arrangement of the concentric circular rings $a^2$ and the rigidly-connecting stays $a^3$ is such as to form in the bottom of the receptacle around the central standard a plurality of circumferentially-separated curved slots or openings between the adjacent rings

$a^2$ and concentric with the center of the bottom, the stays being spaced at such wide distances apart as to make the slots long enough to receive and hold the lower edges of dishes, such as plates or saucers. As before stated, the plates or other articles to be drained are adapted to rest at their upper edges against the standard B and to fit at their lower edges into the curved slots or spaces between the rings forming the bottom thereof, said notches preventing the lower edges of the plate from slipping outwardly, and thereby enabling them to be maintained in an inclined position against the central standard. Each of the plates or other like articles to be drained will rest at two separated points in its circumference against the stays on each side of the slot with which its lower edge is engaged, the portion of the margin of the said plate between said stays projecting through the bottom a sufficient distance to insure a proper engagement of the plate therewith. This arrangement limits the movement of the dishes in said notches and prevents them rolling around the standard under the action of gravity, as would be true if the slots were continuous or annular. In order that the notches adjacent to the base of the central standard, which are of gradually-decreasing length by reason of the radial arrangement of the connecting-stays, may not be divided into sections of too short a length, each alternate stay $a^3$ may be terminated between the rim and said central standard, as shown in Fig. 1. This construction of the bottom prevents the plates from becoming nicked and broken by being thrown against each other.

The hollow interior of the central supporting-standard is designed to receive knives, forks, and like articles in an upright position to be rinsed, said interior of the standard being constructed to retain the said articles in proper position therein. For this purpose and as a further and separate improvement said hollow standard is provided with a receptacle C of closely-woven material, which is attached to and supported within the standard and is preferably of a length to extend nearly or quite to the base of the standard. Said basket will be conveniently made of relatively-light and closely-woven wire-cloth, which is given the proper form by the use of a suitable die and is provided on its upper and lower ends with stiffening-rings C', which give rigidity and permanence to the same. Said central basket is shown as supported from the top thereof upon the upper ring $b$ of the standard B. The basket may either be permanently attached to the standard or may be made detachable therefrom, as found most convenient or desirable. In the former instance the upper edge of the material forming the basket may be attached directly to the upper rings $b$ of the standard, and the stiff ring C' will be omitted, as shown in Fig. 4. If the basket be made detachable, it will be made of greater diameter at its top than the diameter of the top of the standard, thereby permitting it to be suspended from the standard and preventing the same from slipping therethrough.

For convenience in packing either for shipping or storing the center basket C will preferably be made detachable from the standard. When this is done, a large number of drainers may be nested together, the upwardly-tapering construction of the standard and the upwarly-flaring shape of the rim permitting this arrangement. The central baskets C will also preferably be made of tapering form to permit them to be nested in shipping and storing them.

The drainer shown in the drawings is circular and may be used in connection with a pan of any ordinary form, which latter will receive the drip-water. When the drainer is to be used in connection with other-shaped receptacles, such as a sink, it may be made of a form most convenient for use in such receptacle; but it will be desirable in all cases that the bottom of the drainer preserve substantially the form shown in the drawings—that is to say, composed of a plurality of circular concentric rings separated at such distances as to provide curved openings or spaces to receive the lower edges of the dishes. The legs or standards $A^3$ will be made of such lengths as to hold the bottom of the drainer at a distance from the surface upon which it rests, thereby insuring the edges of the dishes being held out of the drip-water in case it is not led immediately away from the receptacle in which it is placed.

A drainer made in accordance with my invention is very light and economical to manufacture, but exceedingly strong and durable. The upwardly-tapering form of the central supporting-standard is of much importance, as it enables the dishes to engage the bottom of the drainer closely adjacent to the base of the standard and at the same time assume an inclined position, so that they will not tend to fall away from the standard. If the standard were made of uniform diameter throughout its length, it is obvious that the bottom edges of the plates or other like articles would need to be set at some distance from the base of the standard, thereby considerably decreasing the capacity of the drainer. In practice such articles as plates, saucers, and the like will occupy that part of the drainer adjacent to the central supporting-standard, while the dishes of irregular form will be placed near the rim thereof. The construction of the bottom of the drainer is such as to prevent the plates and other flat dishes becoming too closely packed, so that air may circulate freely between the same, and said plates prevented from being steamed from the hot water by which they are rinsed, thereby causing water to collect on the surface of the plates or dishes which are being rinsed. This feature is important by reason of the fact that the rinsing of the dishes when arranged to permit a free circulation of air between them serves to almost dry them without the use of a towel, thereby enabling the dishes to be dried with fewer towels and less labor. A further advantage of having the dishes separated from each other is that this enables both sides of the dishes to be rinsed, which could not be done if they were packed closely together. The use of the central basket C is of great importance, as it holds the knives and forks entirely out of the water and prevents the drip-water from loosening the handles thereof, as is the case where said handles are exposed to the drip-water. Moreover, by the use of such central basket the knives, forks, and spoons are held in such position as to be readily grasped without the necessity of putting the hand into hot rinsing-water. Moreover, the knives, forks, and spoons are prevented from rubbing against each other and the dishes and becoming scratched, as is the case where they are placed in the bottom of the receptacle or pan. A further and important advantage gained by the use of the wire bottom arranged to form curved grooves or openings of such length as to receive or engage the lower edges of the dishes is that by this construction dishes, such as plates of relatively-large size, may be safely held in a drainer having a relatively-low rim, because when the lower edges of the plates are positively engaged with the said grooves they may rest against the top edge of the rim without liability of falling out of the drainer, even though they project in their greater part above the top edge of said rim.

I claim as my invention—

1. A dish-drainer, comprising an outer rim, an inner stand upwardly projected, a series of stays or braces extending laterally from the inner stand to the outer rim or body, a series of tie-strips for the stays or braces arranged to form therewith an open-work bottom having spaces adapted for the admission of the lower edges of dishes standing edgewise and so arranged that each dish rests against the adjacent stays or braces and will be supported against the inner stand or against the outer rim or body in an inclined position, and a support extending below the plane of the bottom to elevate the same and allow for the projection of the edges of the dishes below the bottom.

2. A dish-drainer comprising an outer rim or body, having an upper rail an intermediate rail and a lower rail, an inner stand, a series of stays or braces extending laterally from the inner stand to the outer rim or body, with plain smooth faces, a series of tie-strips for the stays or braces forming therewith an open-work bottom having spaces adapted for the admission of the lower edges of dishes standing edgewise and so arranged that the edge of each dish will rest on adjacent stays or braces and the dish will be supported in an inclined position either against the inner stand or against the upper rail of the rim or body, and a support beneath the bottom to elevate the same and form a space for the projection of the edges of the dishes below the bottom.

3. A dish-drainer comprising an outer rim or body, having an upper rail an intermediate rail and a lower rail, an inner stand, a series of stays or braces bent into a U shape and extending from the inner stand to the outer rim or body and forming supports for the stand and the rim or body, a series of tie-strips for the stays or braces forming therewith an open-work bottom having spaces adapted for the admission of the lower edges of dishes standing edgewise, and so arranged that the edge of each dish rests on adjacent stays or braces and will be supported by resting either against the inner stand or against the upper rail of the rim or body, and a support beneath the bottom to elevate the same and form a space for the projection of the edges of the dishes below the bottom.

4. A dish-drainer comprising an annular outer rim or body, a central annular or tubular standard upwardly projected, a series of stays or braces extending radially from the stand to the outer rim or body and bent to form a bottom portion and upright portions supporting the stand and the body, a series of tie-strips for stays or braces arranged parallel with each other and forming with the stays or braces an open-work bottom having spaces of a circular shape on the sides adapted for the admission of the lower edges of dishes standing edgewise and so arranged that each dish will rest on adjacent stays or braces and will rest in an inclined position either against the central stand or the outer rim or body, and legs projected below the bottom.

5. A dish-drainer comprising an annular outer rim or body formed of a plurality of wires located in planes one above the other, a central annular or tubular stand formed of a plurality of wires located in planes one above the other, a series of stays or braces bent to form a bottom portion and upright portions attached to and supporting the wires of the outer rim or body and the wires of the central stand, a plurality of tie-wires forming the radial stays or braces arranged parallel with each other and forming with the stays or braces an open-work bottom having spaces adapted for the admission of the lower edges of dishes standing edgewise and so arranged that the edge of each dish will rest on the faces of adjacent stays or braces and the dish will rest in an inclined position either against the outer rim or body or against the inner stand, and legs projecting below the bottom to elevate the same and permit the edges of the dishes to be entered through the spaces and extend below the bottom.

6. In a dish-drainer, the combination of an annular outer rim or body composed of a plurality of wires arranged in planes one above the other, a central annular or tubular stand formed of a plurality of wires arranged in planes one above the other, a series of radial stays or braces bent to have a bottom portion and an upright portion at each end of the bottom portion forming supports for the outer rim or body and the inner stand, with a number of such stays or braces downwardly bent at the outer end forming legs for supporting the drainer, and a series of annularly-arranged tie-wires for the stays or braces running parallel with each other and forming with the stays or braces curved spaces for receiving the lower edges of dishes standing edgewise and so arranged that the edge of each dish will rest on adjacent stays or braces and the body will rest against the stand or the outer rim or body with the edge projecting through the bottom into the raised space formed by the legs.

7. In a dish-drainer, the combination of an annular outer rim or body composed of a plurality of wires arranged in planes one above the other, a central annular stand composed of wires arranged in planes one above the other, a series of radial stays or braces each formed of wire bent into a U shape to have a bottom portion and upright end portions to form a support for the wires of the rim or body and the stand and having a number of such stays or braces provided with a downwardly-extending portion forming legs, a series of tie-wires for the radial stays or braces forming with the stays or braces curved spaces for receiving the lower edges of dishes for standing edgewise and so arranged that the edge of each dish will rest on adjacent stays or braces and the dishes will be inclined and rest either against the central stand or the outer rim or body, and a receptacle inserted within the central stand and adapted to receive spoons, knives and forks.

8. In a dish-drainer, the combination of an upwardly and outwardly inclined annular rim or body composed of a plurality of wires, a tapered annular central stand composed of a plurality of wires arranged in planes one above the other, a series of radial stays or braces each formed of a wire bent to have a bottom portion and end portions forming supports for the outer rim or body and the central stand, a series of tie-wires for the radial stays or braces forming with such stays or braces curved spaces adapted for the admission of the lower edges of dishes standing edgewise and so arranged that the edge of each dish will rest on adjacent stays or braces and will rest either against the central stand or the outer rim or body, supporting-legs formed by bending some of the radial stays or braces downwardly thereby elevating the bottom and leaving a space for the admission of the edges of the dishes, and a receptacle oppositely tapered to the taper of the central stand and inserted in said stand to furnish a receptacle for spoons, knives and forks.

9. In a dish-drainer, the combination of an annular rim or body composed of a plurality of wires arranged in planes one above the other, a central annular stand composed of wires arranged in planes one above the other, a series of radially-extending stays or braces each formed of a piece of wire bent to have an upward portion and end portions supporting the wires of the outer rim or body and the central stand, a series of tie-wires for the radial stays or braces forming with the stays or braces graduated curved spaces for receiving the lower edges of dishes standing edgewise and so arranged that the smaller dishes will enter the inner curved spaces and the larger dishes will enter the outer series of curved spaces, and the upper parts of the dishes will rest on the faces of adjacent stays or braces and on the central stand or the outer rim or body in an inwardly or outwardly inclined position, and legs formed by bending a number of stays or braces downwardly, thereby furnishing a space below the bottom for the projection of the edges of the dishes when entered into the curved spaces, substantially as described.

In testimony that I claim the foregoing as my invention I affix my signature, in presence of two witnesses, this 2d day of April, A. D. 1898.

MARIE L. PRICE.

Witnesses:
W. A. WHITEHEAD,
WILLIAM L. HALL.